United States Patent [19]
Sato et al.

[11] Patent Number: 5,903,707
[45] Date of Patent: *May 11, 1999

[54] IMAGE SIGNAL PROCESSING DEVICE IN WHICH A FRAME IS DIVIDED INTO A PLURALITY OF PARTS

[75] Inventors: Koichi Sato; Yasuhiro Yamamoto, both of Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/665,772

[22] Filed: Jun. 18, 1996

Related U.S. Application Data

[63] Continuation of application No. 08/237,556, May 3, 1994, abandoned.

[30] Foreign Application Priority Data

May 6, 1993 [JP] Japan ................................. 5-129974

[51] Int. Cl.$^6$ .................................................... H04N 5/76
[52] U.S. Cl. ............................................ 386/121; 386/125
[58] Field of Search .................................... 386/1, 45, 46, 386/37, 40, 122–126, 36; 365/189.04, 230.05, 239, 233, 221, 220

[56] References Cited

U.S. PATENT DOCUMENTS

| | | | |
|---|---|---|---|
| 4,592,019 | 5/1986 | Huang et al. ............................ | 365/221 |
| 4,660,096 | 4/1987 | Arlan et al. ............................. | 358/310 |
| 4,857,910 | 8/1989 | Baunach ................................. | 345/203 |
| 5,079,545 | 1/1992 | Priem et al. ........................... | 345/200 |
| 5,159,460 | 10/1992 | Senso .................................... | 358/310 |
| 5,204,668 | 4/1993 | Ferrer et al. ........................... | 345/203 |
| 5,309,168 | 5/1994 | Itoh et al. .................................. | 345/3 |
| 5,363,264 | 11/1994 | Cavanaugh et al. ................... | 360/11.1 |
| 5,434,675 | 7/1995 | Sato . | |
| 5,526,138 | 6/1996 | Sato . | |
| 5,546,192 | 8/1996 | Sato . | |
| 5,606,427 | 2/1997 | Sato . | |
| 5,748,829 | 5/1998 | Yamamoto et al. . | |

FOREIGN PATENT DOCUMENTS

| | | | |
|---|---|---|---|
| 3-125187 | 5/1991 | Japan .............................. | G09G 3/28 |
| 5-30461 | 2/1993 | Japan . | |
| 5-48999 | 2/1993 | Japan . | |
| 5-56391 | 3/1993 | Japan . | |
| 5-56392 | 3/1993 | Japan . | |
| 2257868 | 1/1993 | United Kingdom . | |

*Primary Examiner*—Tommy P. Chin
*Assistant Examiner*—Y. Lee
*Attorney, Agent, or Firm*—Greenblum & Bernstein, P.L.C.

[57] ABSTRACT

An image signal generating device has a Y-memory, an R-Y-memory and a B-Y-memory, in which a luminance signal and R-Y and B-Y color differential signals are stored, respectively. When the luminance signal and the color differential signals are recorded on a magnetic disk, the signals are read out from the memories in such a manner that an upper half of the frame is read in a first order and a lower half of the frame is read in a second order which is the inverse of the first order. The first order corresponds to a direction from the upper side of the frame to the middle portion of the frame. The second order corresponds to a direction from the lower side of the frame to the middle portion of the frame.

11 Claims, 10 Drawing Sheets

IMAGE SIGNAL PROCESSING DEVICE IN WHICH A FRAME IS DIVIDED INTO A PLURALITY OF PARTS

This application is a continuation of application Ser. No. 08/237,556, field May 3, 1994, now abandoned.

BACKGROUND OF THE INVENTION

1. Field of the Invention

The present invention relates to an image signal processing device by which an image signal corresponding to one frame is divided into a plurality of parts to be recorded on a plurality of tracks of a recording medium, such as a magnetic disk.

2. Description of the Related Art

In a typical still video device, an image signal inputted thereto is frequency-modulated and recorded on a magnetic disk, and the frequency band of the signal recorded on the magnetic disk is regulated. Nevertheless, the bandwidth of the signal is limited, due to the construction of the disk device, and thus, cannot be freely expanded. Accordingly, in a conventional still video device, when an image signal having a high quality or broad bandwidth is inputted to the still video device, a limit is imposed on the resolution of the image and thus, the quality of the image is limited.

The inventor proposed, in U.S. patent application Ser. No. 07/913,191, corresponding to Japanese Unexamined Patent Publication Nos. 5-30461, 5-48999, 5-56391 and 5-56392), a still video device in which an image signal corresponding to one frame is divided into a plurality of parts and stored in a memory, and the divided parts of the image signal are time-expanded and recorded on a plurality of tracks of a recording medium, such as a magnetic disk, so that a high quality image can be obtained without changing the bandwidth of a signal recorded in the recording medium.

In this still video device, when the image signal is A/D converted to be stored in the memory, the standard of the A/D conversion is set by using a pedestal level provided at a starting point of each of horizontal scanning lines. Namely, in a clamping circuit, the pedestal level is clamped based on a clamp pulse such as a burst flag signal generated in accordance with a horizontal synchronizing signal, and shifted to the standard level of the A/D conversion.

As shown in FIG. 1, however, in the vertical synchronizing period Vsync, since there is no pedestal level (i.e., clamp pulse), the clamping circuit must be stopped. Accordingly, in the vertical synchronizing period Vsync, the output voltage of the clamping circuit is lowered due to the time constant of the clamping circuit, and it takes some time until the output voltage recovers to the normal value after a new horizontal synchronizing signal is inputted to the clamp circuit.

Namely, regarding a horizontal scanning line N which is provided immediately after the vertical synchronizing period Vsync, the A/D conversion value is set to a lower value than the normal value as indicated by the reference M. Therefore, as shown in FIG. 2, in the upper portion of each of the divided frames, the luminance signal level is made low, and thus, the portion immediately after the join portion J formed by combining the two divided frames is darkened.

SUMMARY OF THE INVENTION

Therefore, an object of the present invention is to provide an image signal processing device by which, when an image signal corresponding to one frame which is divided into a plurality of parts and stored in a memory is read from the memory, a dark line is not generated near the join portion where the divided frames are joined.

According to the present invention, there is provided an image signal processing device comprising storing means, and reading means. The storing means stores an image signal corresponding to one frame in a memory. The reading means reads the image signal stored in the memory in such a manner that the upper half of the frame is read in a first order and the lower half of the frame is read in a second order which is the inverse of the first order.

Further, according to the present invention, there is provided a device for processing an image signal having a plurality of horizontal scanning lines forming one frame, the device comprising storing means and reading means. The storing means stores the image signal in a memory in such a manner that the horizontal scanning lines are stored in a predetermined order. The reading means reads the image signal stored in the memory in such a manner that horizontal scanning lines of the upper half of the frame are read in a first order and horizontal scanning lines of the lower half of the frame are read in a second order which is the inverse of the first order.

Furthermore, according to the present invention, an image signal processing device is provided comprising storing means and reading means. The storing means stores the image signal in a memory. The reading means reads the image signal stored in the memory in such a manner that the one frame has an upper half and a lower half which are divided by a line extending in a horizontal direction of the frame. The reading means reads an upper half image signal corresponding to the upper half in a first order, and reads a lower half image signal corresponding to the lower half in a second order which is the inverse of the first order.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
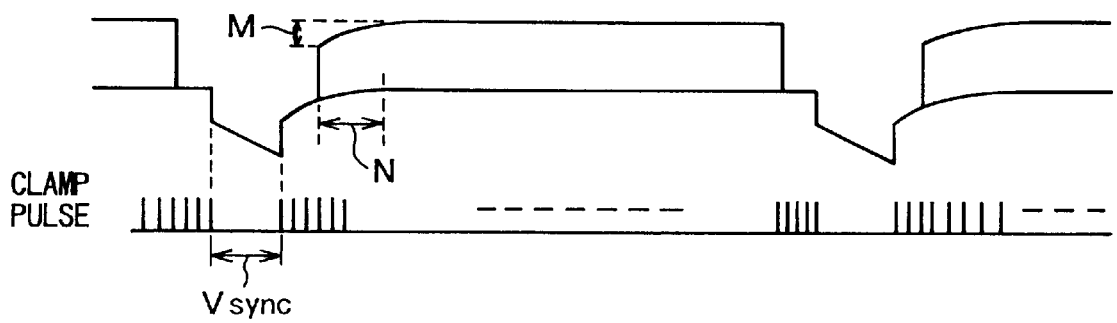
FIG. 1 is a diagram schematically showing an image signal generated by a conventional device.
Figure 2:
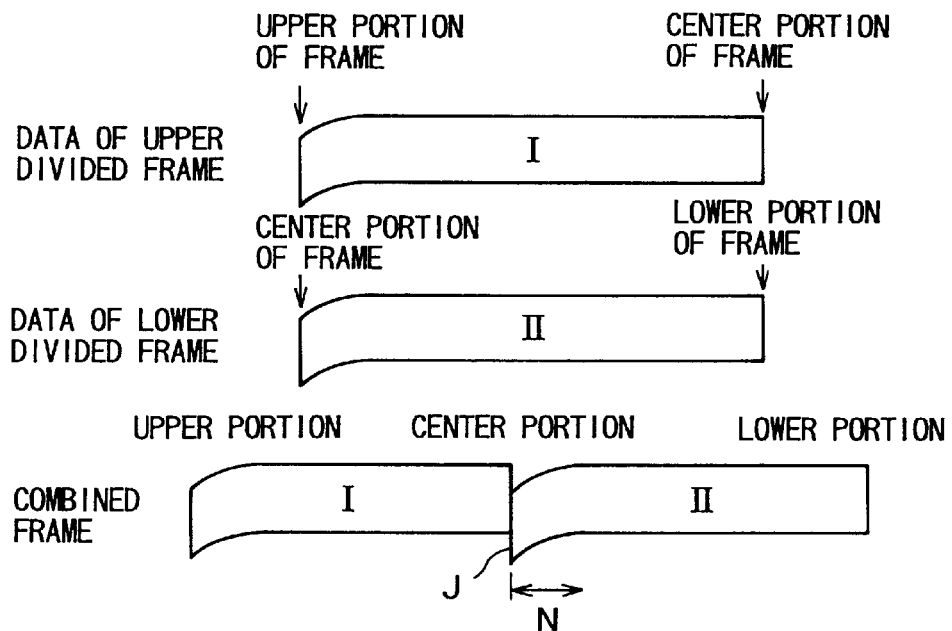
FIG. 2 is a diagram schematically showing a state in which a dark line is generated at a join portion between divided image signals in the conventional device.

The present invention will now be described with reference to an embodiment shown in the drawings.

Figure 3:
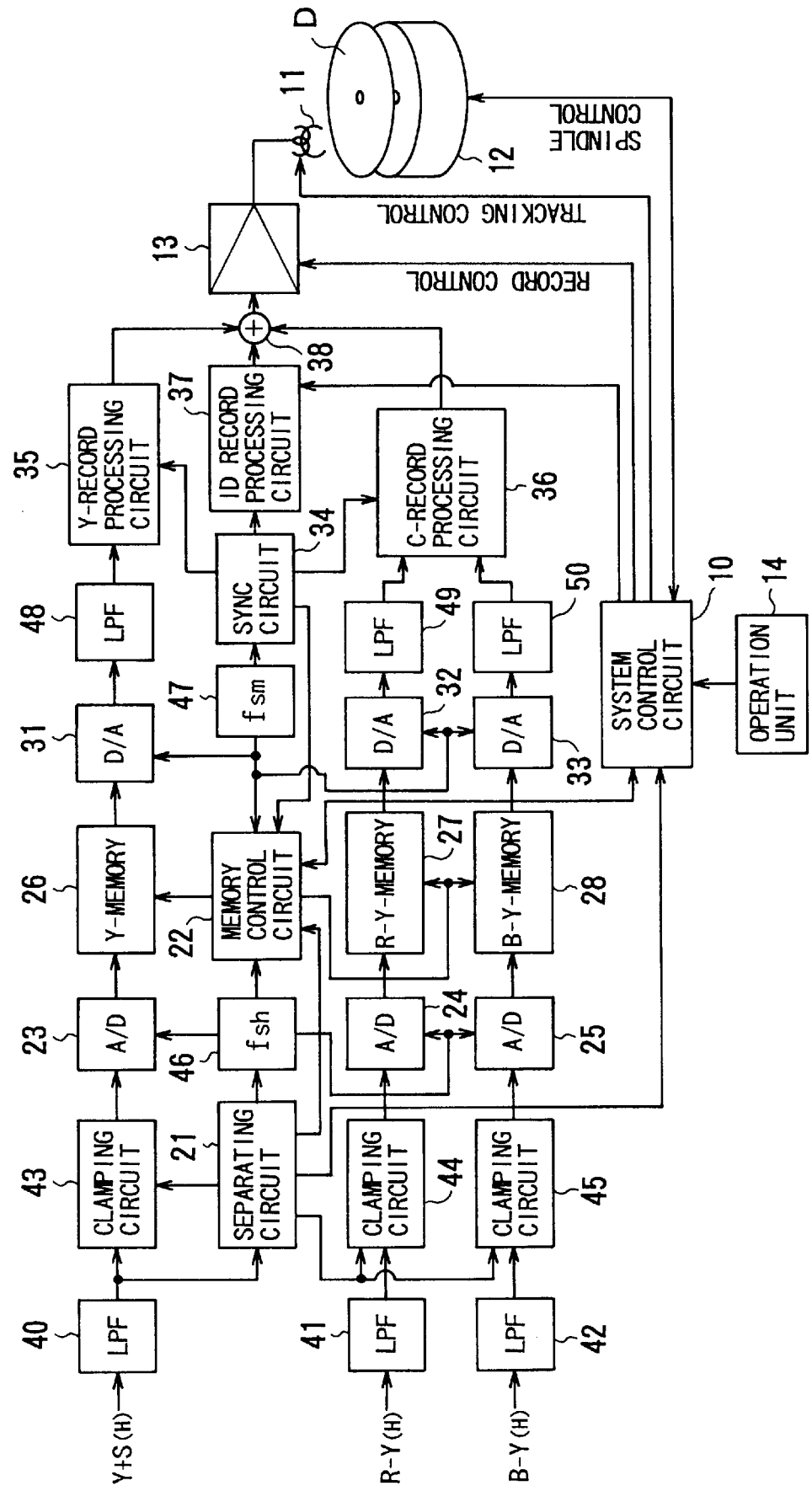
FIG. 3 is a block diagram showing a recording system for a still video device according to an embodiment of the present invention.

FIG. 3 is a block diagram showing a recording system of a still video device to which an embodiment of the present invention is applied.

A system control circuit 10 comprises a microcomputer that controls the whole still video device. A disk device has a magnetic head 11 and a spindle motor 12 for rotating a magnetic disk D. The magnetic head 11 is controlled by the system control circuit 10 to be displaced along a radial direction of the magnetic disk D, and thus, positioned at a predetermined track on the magnetic disk D. The spindle motor 12 is controlled by the system control circuit 10 to rotate the magnetic disk D at a rotation speed of 3,600 rpm, for example. During the rotation of the magnetic disk D, the magnetic head 11 is positioned at a predetermined track on the magnetic disk D and records image signals and identification (ID) codes on this track. A recording amplifier 13 is controlled by the system control circuit 10 and outputs image signals, ID codes and other signals to the magnetic head 11. Note, the magnetic disk D has 52 tracks, and the image signals and the other signals are recorded on 50 tracks starting from the outermost track and continuing inward.

An operation unit 14 is connected to the system control circuit 10, to operate the still video device. Note, a record mode, a recording date, and so on, which are ID codes related to an image recorded in the magnetic disk D, are inputted through the operation unit 14.

Figure 11:
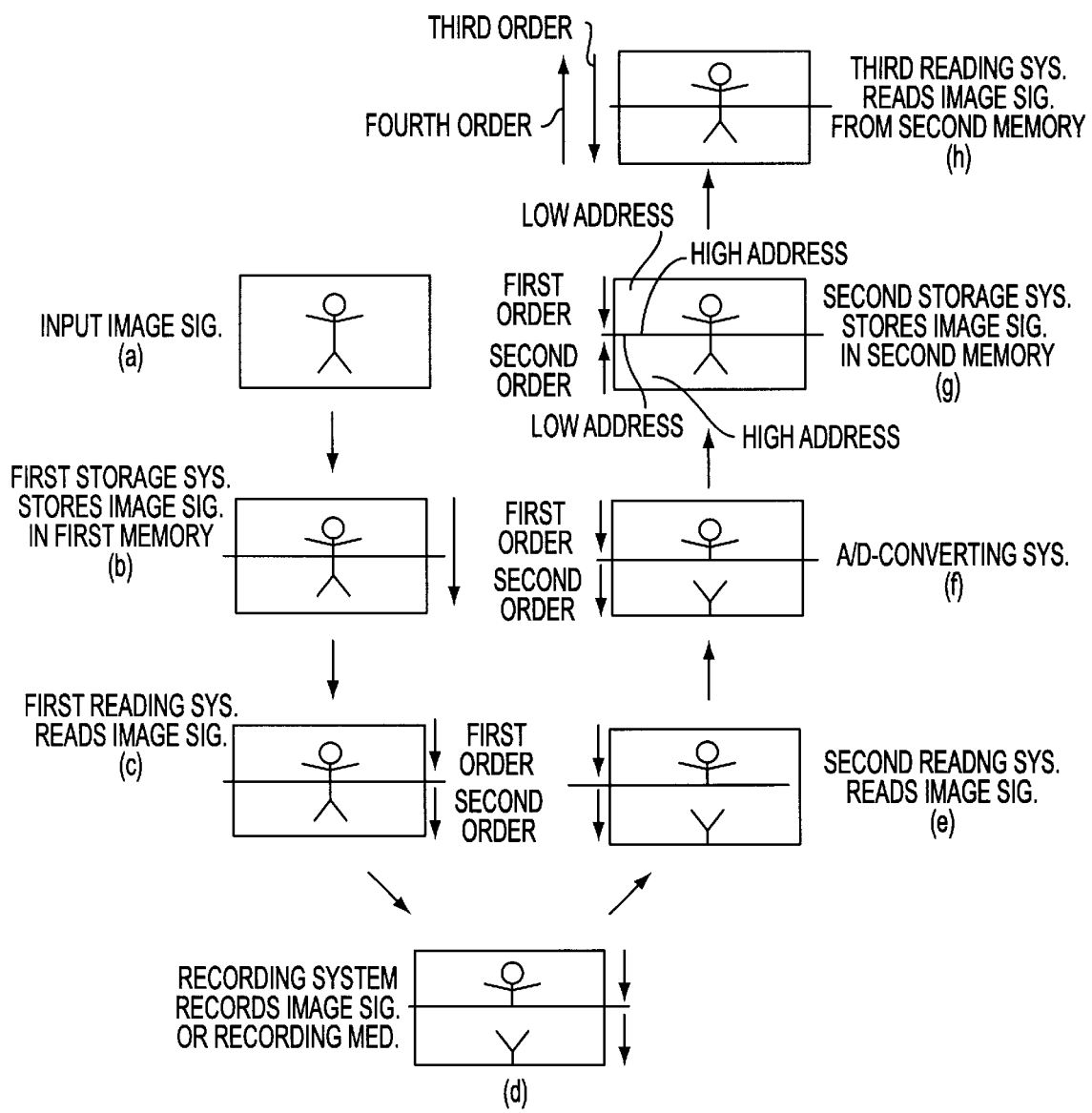
FIGS. 11(a) to 11(h) illustrate the operation of the present invention.

High quality images signal obtained from a still video camera (not shown) or through an input terminal (not shown) are inputted to the still video device as a luminance signal (Y+S(H)) including a synchronizing signal (S(H)), differential color signals (R−Y(H)) and (B−Y(H)), as represented by FIG. 11(a). Note, in the drawing, the reference "H" added to the inputted signals indicates that the inputted image signal has been generated in accordance with the HDTV (High Definition TV) mode.

The luminance signal (Y+S(H)) is inputted to a low pass filter 40, and thus, high frequency components having a frequency higher than a half of a sampling frequency of an A/D conversion by an A/D converter 23 are removed. Then, the luminance signal (Y+S(H)) is inputted to a synchronizing-signal-separating circuit 21 and a clamping circuit 43.

The synchronizing signal S(H) included in the luminance signal (Y+S(H)) is separated from the luminance signal by the synchronizing-signal-separating circuit 21, so that clock signals generated in accordance with the synchronizing signal are transmitted to clamping circuits 43, 44, 45, a clock generating circuit 46, a memory-control circuit 22 and the system control circuit 10.

In the clock generating circuit 46, a first sampling clock $f_{sh}$ is, generated which is synchronized with a clock signal outputted from the synchronizing-signal-separating circuit 21. The first sampling clock $f_{sh}$ has a frequency of about 74.25 MHz. The sampling clock $f_{sh}$ is outputted to A/D converters 23, 24, 25 and the memory control circuit 22. On the other hand, in the clamping circuit 43, the pedestal level of the luminance signal (Y+S(H)) outputted from the low pass filter 40 is clamped at a standard level for an A/D conversion by the A/D converter 23, in which the luminance signal (Y+S(H)) is sampled in accordance with the sampling clock $f_{sh}$ inputted from the clock generating circuit 46, and thus, a digital luminance signal is outputted to a Y-memory 26.

Similarly, regarding each of the differential color signals (R−Y(H)) and (B−Y(H)), high frequency components having a frequency higher than a half of the sampling frequency of the A/D conversion rate used by the A/D converters 24 and 25 are removed by each of the low pass filters 41 and 42, and the pedestal level is clamped by each of the clamping circuits 44 and 45. Then, in the A/D converters 24 and 25, the differential color signals (R−Y(H)) and (B−Y(H)) are sampled in accordance with the sampling clock $f_{sh}$ outputted by the clock generating circuit 46, and thus, digital differential color signals (R−Y(H)) and (B−Y(H)) are outputted to an R−Y-memory 27 and a B−Y-memory 28, respectively.

The digital luminance signal and the digital differential color signals are written in predetermined addresses in the Y-memory 26, the R−Y-memory 27 and the B−Y-memory 28, respectively, at a timing synchronized with the horizontal synchronizing signal. These writing addresses are generated by the memory control circuit 22 and inputted to the memories 26, 27 and 28 as represented by FIG. 11(b).

When one complete frame of image data is written in the Y-memory 26, the R−Y-memory 27 and the B−Y-memory 28, a writing completion signal is transmitted from the memory control circuit 22 to the system control circuit 10. After the reception of the writing completion signal by the system control circuit 10, the magnetic head 11 is controlled by the system control circuit 10 and is moved to a blank track on the magnetic disk D. At the same time, a readout command is outputted to the memory control circuit 22 by the system control circuit 10.

Note, the tracking control by which the magnetic head 11 is moved to a blank track is carried out in accordance with track information regarding each of track on the magnetic disk D. The track information is stored in a work memory, not shown. The track information shows whether or not a track of the magnetic disk D is a blank track, and shows the kind of the recorded signal in case of a track on which a signal is recorded. Namely, the system control circuit 10 senses a blank track in accordance with the track information stored in the work memory.

After the positioning of the magnetic head 11 is carried out, address signals are generated by the memory control circuit 22 according to a command outputted by the system control circuit 10, and are outputted to the Y-memory 26, the R−Y-memory 27 and the B−Y-memory 28, so that the luminance signal and the color differential signals are read out from the memories 26, 27 and 28, respectively. The address signals are synchronized with a second sampling clock $f_{sm}$ which is inputted from a clock generating circuit 47 and has a frequency $f^{sh}/4$. Namely, the frequency of the second sampling clock $f_{sm}$ is lower than that of the first sampling clock $f_{sh}$.

Figure 4:
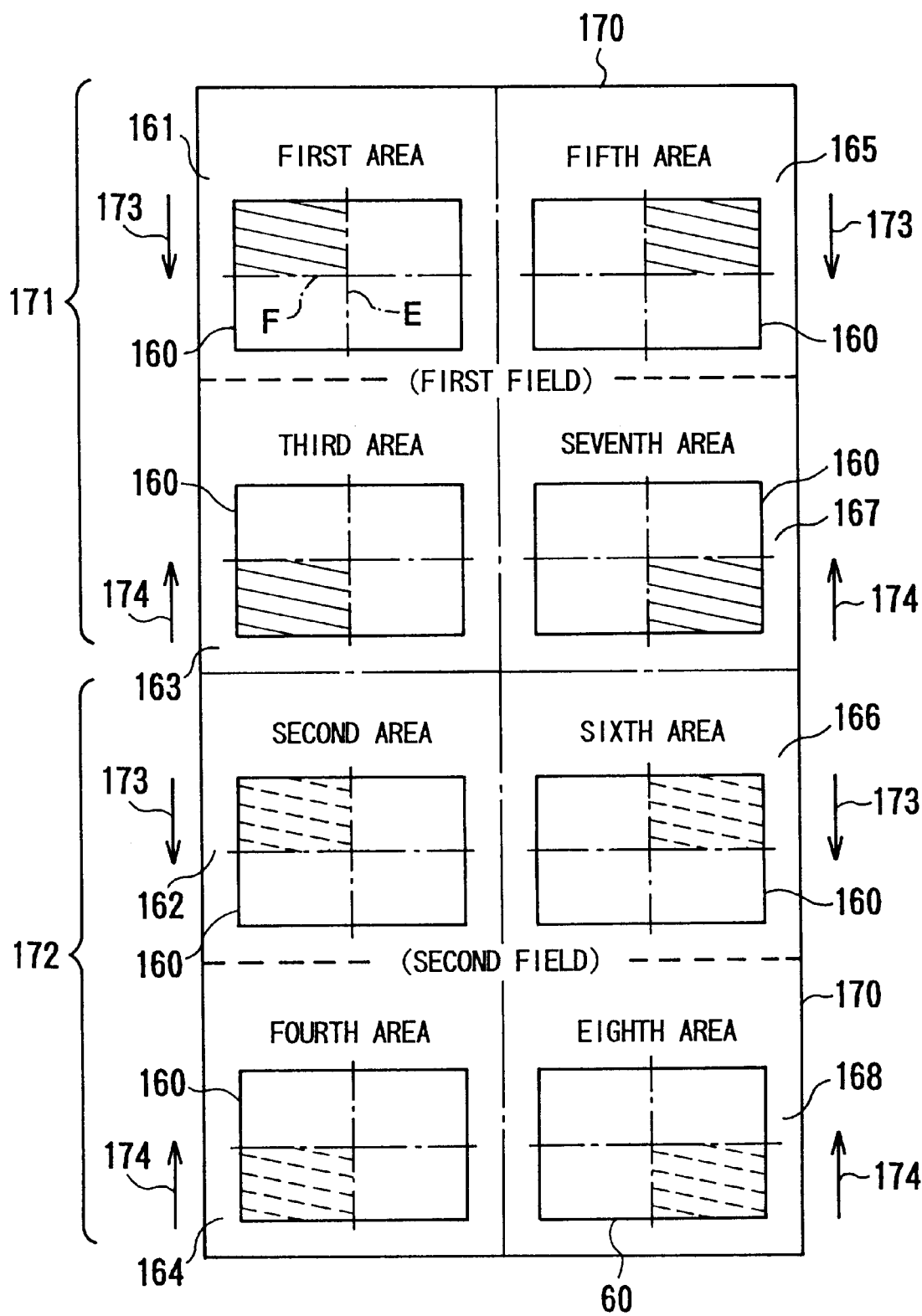
FIG. 4 is a diagram schematically showing an example of recording image signals in each memory.
Figure 5:
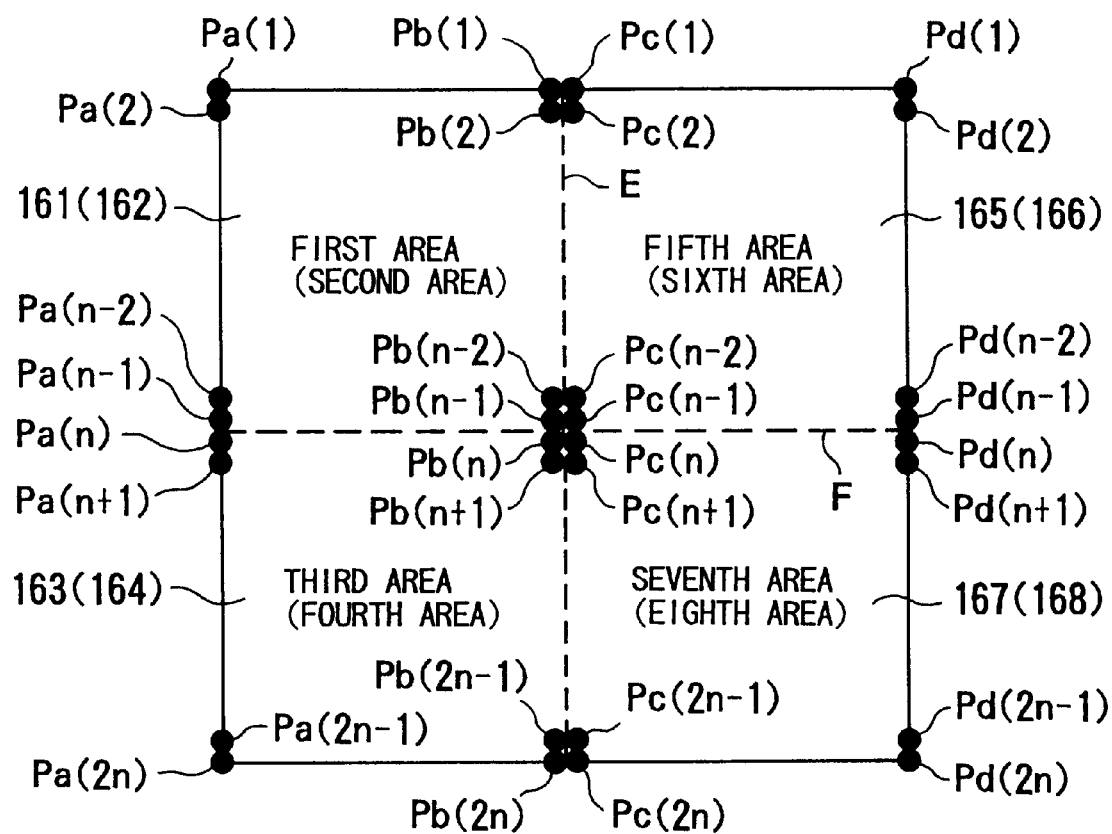
FIG. 5 is a diagram showing addresses of the memories.

The order in which the luminance signal and the color differential signals are read out from the Y-memory 26, the R−Y memory 27 and the B−Y-memory 28 is described below with reference to FIGS. 4 and 5. FIG. 4 schematically shows an example of recording image signals in each of the Y-memory 26, the R−Y-memory 27 and the B−Y-memory 28 in such a manner that the divided image signals are indicated on an actual frame. FIG. 5 schematically shows memory addresses in each of the memories 26, 27 and 28.

Note, the order in which the luminance signal and the color differential signals are read out are the same, and therefore, only the order in which the luminance signal is read out is described below.

In FIG. 4, an outer frame 170 shows a whole recording area of the memory. A first field of an HDTV image signal is stored in a memory area 171, and a second field of the HDTV image signal is stored in a memory area 172. Each of several small frames 160 shown in the outer frame 170 corresponds to an image frame indicated on a display device.

The HDTV image signal has a plurality of horizontal scanning lines forming one frame. A main-scanning direction corresponds to a direction in which each of the horizontal scanning lines extends, and a sub-scanning direction corresponds to a vertical direction of the image frame.

As shown in FIG. 4, each of the small frames 160 is divided into an upper half and a lower half by a line F extending in a horizontal direction and passing through the center of the frame, and is divided into a right half and a left half by a line E extending in a vertical direction and passing through the center of the frame. Namely, one frame is divided into four parts.

First, the HDTV image signal is stored in the Y-memory 26 in such a manner that the order in which horizontal scanning lines are stored in the memory 26 is the same as that in which the horizontal scanning lines are inputted to this still video device and the storing operation of the image signal is started at the first address of the memory 26.

Namely, regarding the upper half frame of the first field, data of the first half (0.5 H, wherein "H" means a horizontal scanning period) of the image signal are stored in a first recording area 161, and data of the latter half (0.5 H) of the image signal are stored in a fifth recording area 165. Regarding the lower half frame of the first field, data of the first half (0.5 H) of the image signal are stored in a third recording area 163, and data of the latter half (0.5 H) of the image signal are stored in a seventh recording area 167. The last (or bottom) horizontal scanning line of the first field of the HDTV image signal is stored in each of the third and seventh recording areas 163 and 167.

Similarly, regarding the upper half frame of the second field, data of the first half (0.5 H) of the image signal are stored in a second recording area 162, and data of the latter half (0.5 H) of the image signal are stored in a sixth recording area 166. Regarding the lower half frame of the second field, data of the first half (0.5 H) of the image signal are stored in a fourth recording area 164, and data of the latter half (0.5 H) of the image signal are stored in an eighth recording area 168. The last (or bottom) horizontal scanning line of the second field of the HDTV image signal is stored in each of the fourth and eighth recording areas 164 and 168.

The image signal stored in memory 26 is read out therefrom in a different order from that in which the image signal is stored in the memory 26. Namely, regarding the image signal of the upper half frame, the data are read in a first order corresponding to a direction from the upper side of the frame to the middle portion of the frame as shown by an arrow 173 in FIG. 4, and regarding the image signal of the lower half frame, the data are read in a second order corresponding to a direction from the lower side of the frame to the middle portion of the frame as shown by an arrow 174 in FIG. 4. Thus, the second order is inverse of the first order. This represent by FIG. 11(c).

Regarding the image signal stored in the first recording area 161, for example, as shown in FIG. 5, the data are read out in the order Pa(1)→Pb(1)→Pa(2)→Pb(2)→ . . . →Pa(n−2)→Pb(n−2)→Pa(n−1)→Pb(n−1) under control by the memory control circuit 22. The reading operation for the second, fifth and sixth recording areas 162, 165 and 166 are the same as the first recording area 161. For example, in the case of the fifth recording area 165, the data is read out in the order Pc(1)→Pd(1)→Pc(2)→Pd(2)→ . . . →Pc(n−2)→Pd(n−2)→Pc(n−1)→Pd(n−1).

Conversely, regarding the image signal stored in the third recording area 163, for example, as shown in FIG. 5, the data are read out in the order Pa(2n)→Pb(2n)→Pa(2n−1)→Pb(2n−1)→ . . . →Pa(n+1)→Pb(n+1)→Pa(n)→Pb(n). The reading operation for the fourth, seventh and eighth recording areas 164, 167 and 168 are the same as the third recording area 163.

Thus, the image signal stored in the memory 26 is read in such a manner that horizontal scanning lines of the upper half are read in the first order and horizontal scanning lines of the lower half are read in the second order which is the inverse of the first order in the vertical direction. Regarding the horizontal direction, the horizontal scanning lines of the upper and lower halves are read in the same order as each other.

The image signals read from the recording areas 161 through 168 provided in each of the Y-memory 26, the R−Y-memory 27 and the B−Y-memory 28 are recorded on separate tracks of the magnetic disk D, as described below.

The luminance signal and the color differential signals are D/A converted by the D/A converters 31, 32 and 33, respectively, which are operated based on the second sampling clock $f_{sm}$ outputted from the clock generating circuit 47. The D/A converted luminance signal is inputted to a low pass filter 48, and thus, high frequency components having a frequency higher than half of the frequency of the sampling clock $f_{sm}$ are removed. Then, the luminance signal is inputted to a luminance signal processing circuit 35, so that a horizontal synchronizing signal generated by a synchronizing-signal-generating circuit 34 is added to the luminance signal. After this, the luminance signal is FM-modulated and inputted to an adder 38.

Similarly, each of the D/A converted color differential signals is inputted to low pass filters 49 and 50, respectively, and thus, high frequency components having a frequency higher than half of the frequency of the sampling clock $f_{sm}$ are removed. Then, the color differential signals are inputted to a color signal processing circuit 36, so that the color differential signal (R−Y) and the color differential signal (B−Y) are alternatively arranged at every horizontal scanning line of the luminance signal, and thus, a line-sequential color-difference signal is obtained. A horizontal synchronizing signal generated by the synchronizing-signal-generating circuit 34 is added to the line-sequential color-difference signal, which is FM-modulated and inputted to the adder 38.

An ID code inputted through the operating unit 14 and the system control circuit 10 is subjected to a process, such as a differential phase shift keying (DPSK) modulation, by an ID record processing circuit 37. The ID code includes information such as the recording date inputted through the operating unit 14, and a track number inputted by the control circuit 10.

The FM-modulated luminance signal, line-sequential color-difference signal and the DPSK-modulated ID code are superimposed by the adder 38, and then amplified by the record amplifier 13 and transmitted to the magnetic head 11. The luminance signal, line-sequential color-difference signal, and ID code are then recorded on a predetermined track of the magnetic disk D through the magnetic head 11, as represented by FIG. 11(d).

Figure 6:
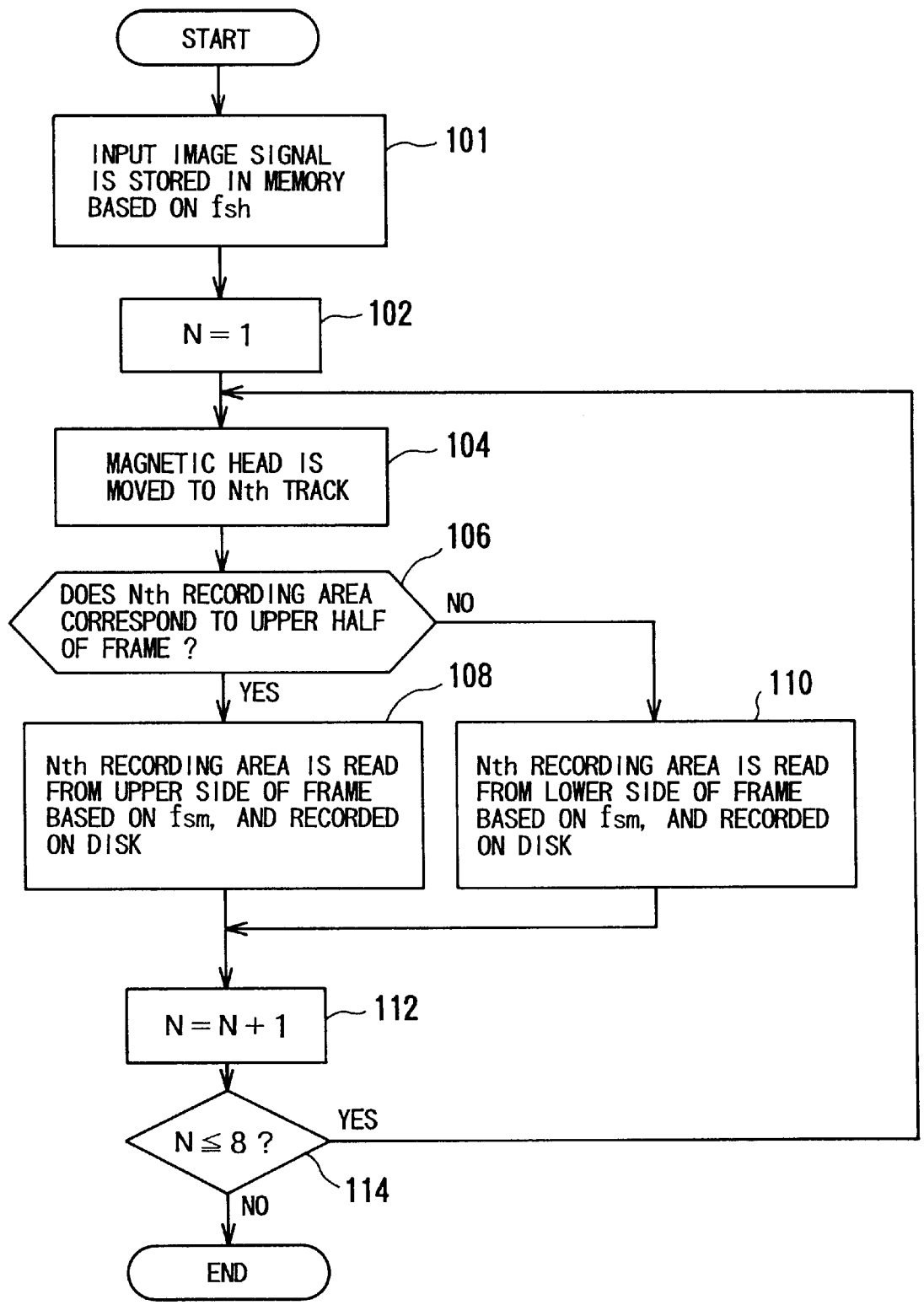
FIG. 6 is a flow chart of a program by which an image signal is divided and recorded on a magnetic disk.

FIG. 6 shows a flow chart of a program by which a luminance signal is stored in the Y-memory 26, and then read from the Y-memory 26 to be recorded on the magnetic disk D. This program is executed by the system control circuit 10.

In Step 101, a luminance signal inputted to the still video device is sampled based on the sampling clock $f_{sh}$, A/D converted by the A/D converter 23, and then stored in the Y-memory 26 a predetermined order. Namely, the luminance signal is stored in the Y-memory 26 in such a manner that the order in which horizontal scanning lines are stored in the memory 26 is the same as that in which the horizontal scanning lines are inputted to the still video device. When the luminance signal of one frame is completely stored in the Y-memory 26, counter N is set to "1" in Step 102. Then, in Step 104, the magnetic head 11 is moved to an Nth track in blank tracks of the magnetic disk D. Note, in this example, it is supposed that a contiguous series of blank tracks exist on the magnetic disk D.

In Step 106, it is determined whether the counter N is 1, 2, 5, or 6. Namely, it is determined whether the luminance signal to be recorded corresponds to an upper half or a lower half of the frame. When the counter N is one of 1, 2, 5, and 6, i.e., when the Nth recording area corresponds to the upper half of the frame, the process goes to Step 108, and in the other case, the process goes to Step 110.

In Step 108, based on the sampling clock $f_{sm}$ inputted from the clock generating circuit 47, address values are generated by the memory control circuit 22, so that the luminance signal is read out as described above with reference to FIG. 5. Namely, data of the luminance signal is read in an order which corresponds to a direction from the upper side of the frame to the middle portion of the frame.

The luminance signal stored in the first, second, fifth or sixth recording areas 161, 162, 165 or 166 is read therefrom based on the address values generated by the memory control circuit 22, and inputted to the D/A converter 31 as a luminance signal of one field according to the still video system. The D/A converted luminance signal is superimposed (frequency-multiplexed) on the color differential signals read from the R–Y-memory 27 and the B–Y-memory 28, and recorded on the magnetic disk D.

When the recording of data from one recording area onto the magnetic disk D is completed, the counter N is incremented by 1 in Step 112, and it is determined in Step 114 whether the counter N is lower than or equal to 8. Namely, it is determined whether or not the image signal stored in the eighth recording area 168 of the Y-memory 26 has been recorded on the magnetic disk D. If this recording operation has not been carried out yet, the process returns to Step 104, and thus the magnetic head 11 is moved to the next track. Then, the next image signal is read out from the Y-memory 26, and recorded on the next track of the magnetic disk D.

On the other hand, when it is determined in Step 106 that the luminance signal to be recorded corresponds to a lower half of the frame, i.e., when the counter N is 3, 4, 7 or 8, Step 110 is performed. In Step 110, data of the luminance signal is read out in an order corresponding to a direction which is from a high-numbered address to a low-numbered address in the Y-memory 26, and then the luminance signal is superimposed on the color differential signals read from the R–Y-memory 27 and the B–Y-memory 28, and recorded on a blank track of the magnetic disk D.

Thus, regarding the first, second, fifth and sixth recording areas 161, 162, 165 and 166 of the Y-memory 26 which correspond to the upper half of the HDTV image frame, data of the image signal is read in order of the direction from a low-numbered address to a high-numbered address. Conversely, regarding the third, fourth, seventh and eighth recording areas 163, 164, 167 and 168 of the Y-memory 26 which correspond to a lower half of the HDTV image frame, data of the image signal is read in order of the direction from a high-numbered address to a low-numbered address.

A first track of the magentic disk D, on which an image signal stored in the first recording area 161 is recorded, is positioned adjacent to a second track on which an image signal stored in the second recording area 162 is recorded, and the second track is positioned inward of the first track. This relationship is applied to the third and fourth recording areas, the fifth and sixth recording areas, and the seventh and eighth recording areas. Therefore, when the HDTV image frame is divided into four parts, and first and second fields of a divided image signal are recorded on two tracks adjacent to each other, only one of the divided parts of a frame can be reproduced if the first and second tracks are reproduced, for example.

Note, as described above, it is supposed in the example that a contiguous series of blank tracks exist on the magnetic disk D. However, if a series of blank tracks do not exist, a plurality of pairs of blank tracks, which are located adjacent to each other, are selected, and thus, an image signal of a first field is recorded on an outer track and an image signal of a second field is recorded on an inner track adjacent to the outer track.

Figure 7:
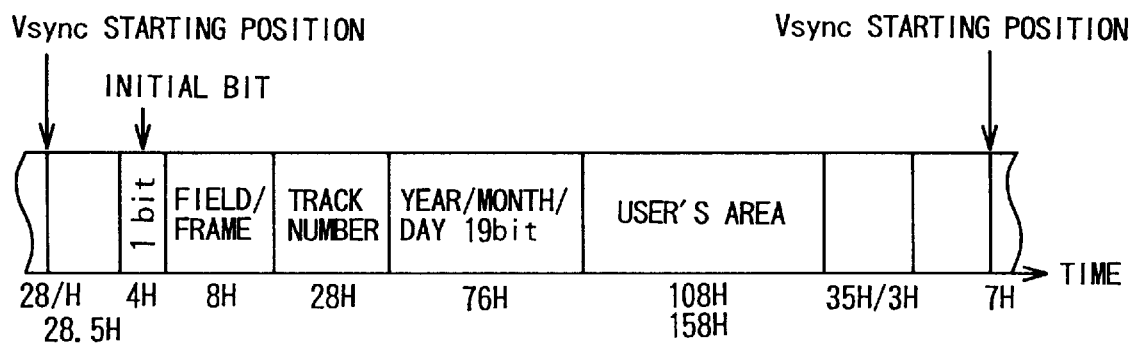
FIG. 7 is a diagram showing a recording format of an ID code.

FIG. 7 shows a recording format of an ID code recorded on the the magnetic disk D. As shown in this drawing, the ID code includes recording information indicating whether the image signal has been recorded in the field record mode or the frame record mode, a track number, a recording date, and so on. The ID code is provided with a user's area, in which recording system information necessary to reproduce the image signal corresponding to one frame is recorded. The record system information includes dividing information indicating how the original image signal recorded in the HDTV system and inputted to the still video device has been divided, and memory information indicating recording areas of the memories in which the divided image signals are stored.

When the divided image signals are recorded on the magnetic disk D, the ID code, including the record system information, is superimposed on each of the upper and lower half image signals, and each of the image signals and the ID code are recorded on a track of the magnetic disk D. When the divided image signals recorded on the magnetic disk D are reproduced, the divided image signals are stored in the predetermined recording areas of each of the memories 26, 27 and 28, by referring to the record system information, so that one frame is reproduced.

Figure 8:
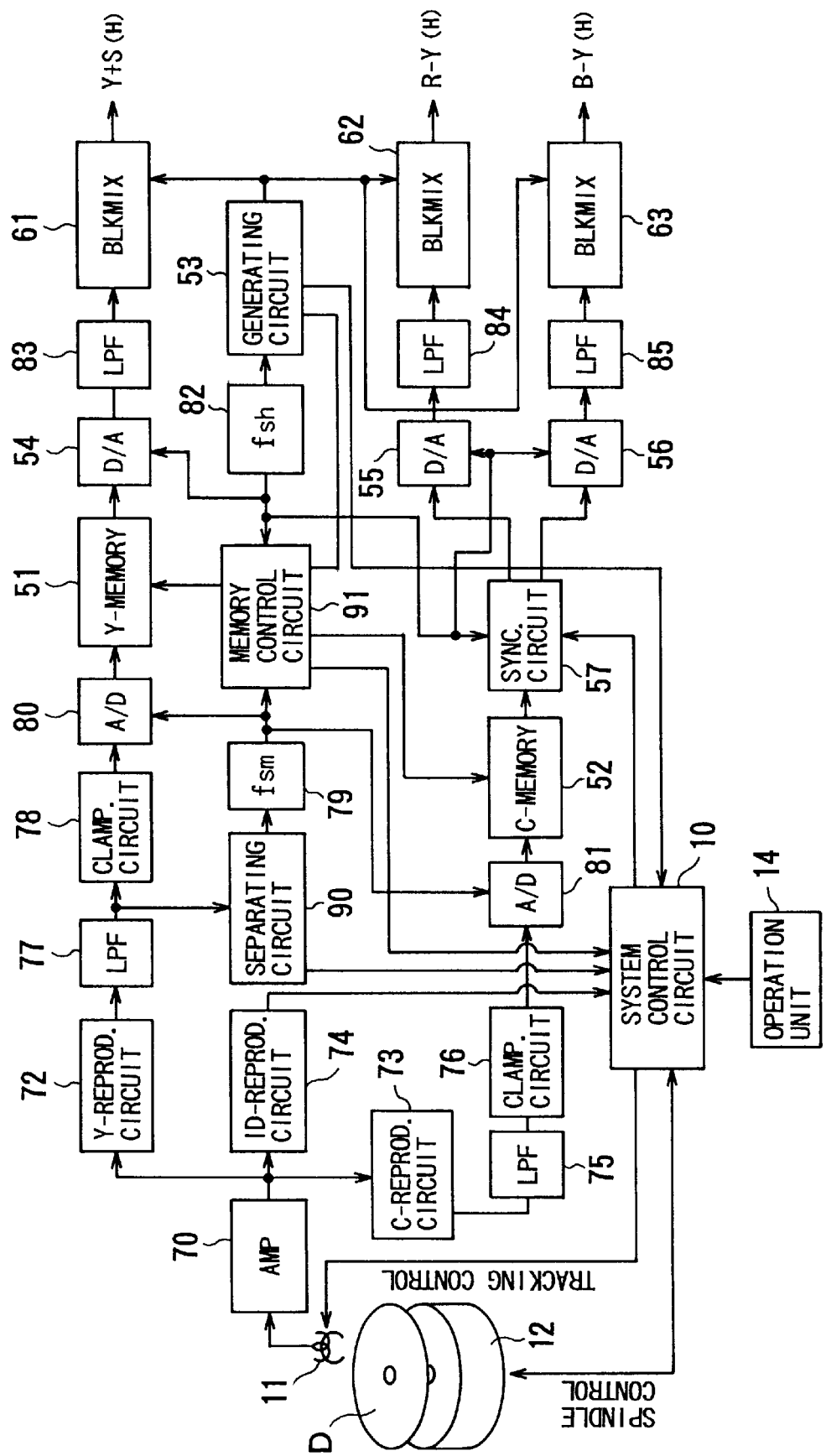
FIG. 8 is a block diagram of a reproducing system of a still video device.

FIG. 8 is a block diagram showing a reproducing system of the still video device to which an embodiment of the present invention is applied.

The system control circuit 10, the magnetic head 11, the spindle motor 12 and the operation unit 14 are also included in the recording system shown in FIG. 3; i.e., are provided for both the recording system and the reproducing system.

The magnetic head 11 is positioned at a predetermined track on the magnetic disk D, so that an ID code and an image signal recorded on the track can be reproduced. A reproducing amplifier 70 reads the image signal and the ID code recorded on the magnetic disk D, and outputs the same to a Y-reproduction process circuit 72, a C-reproduction process circuit 73 and an ID-reproduction process circuit 74, as represented by FIG. 11(e).

The Y-reproduction process circuit 72 frequency-demodulates and outputs the luminance signal (Y+S) including synchronizing signals to a low pass filter 77, in which high frequency components having a frequency higher than half of a sampling frequency of an A/D conversion by an A/D converter 80 are removed from the luminance signal (Y+S).

The luminance signal (Y+S) outputted from the low pass filter 77 is inputted to a clamping circuit 78 and a synchronizing-signal-separating circuit 90. A synchronizing signal S included in the luminance signal (Y+S) is separated therefrom by a synchronizing-signal-separating circuit 90, so that a pulse signal synchronizing with the synchronizing signal S is generated and outputted to a clock generating circuit 79 and the system control circuit 10. In the clock generating circuit 79, a clock $f_{sm}$ synchronizing with the pulse signal inputted from the synchronizing-signal-separating circuit 90 is generated, and outputted to A/D converters 80, 81 and a memory control circuit 91. Note that clock $f_{sm}$ has the same frequency as that of clock $f_{sm}$ used in the recording system shown in FIG. 3.

In the clamping circuit 78, a pedestal level of the luminance signal (Y+S) is clamped at a standard level for the A/D conversion, and outputted to the A/D converter 80, in which an amplitude value of the luminance signal based on the pedestal level is sampled and A/D converted.

On the other hand, the ID code is DPSK-demodulated by the ID-reproducing circuit 74, and outputted to the system control circuit 10, in which the record system information recorded in the user's area of the ID code and superimposed on each of the upper and lower image signals is detected. By using this record system information, the system control circuit 10 commands the memory control circuit 91 to carry out writing address controls for a Y-memory 51 and a C-memory 52, so that the memory control circuit 91 generates a writing address of the Y-memory 51 and the C-memory 52, as described later. The luminance signal outputted by the A/D converter 80 is written to an address of the Y-memory 51 which is designated by an address value inputted from the memory control circuit 91, based on the sampling clock $f_{sm}$.

The color differential signals (R−Y, B−Y) outputted by the reproducing amplifier 70 are frequency-demodulated by a C-reproducing circuit 73, and inputted to a low pass filter 75, in which high frequency components having a frequency higher than half of a sampling frequency of an A/D conversion by an A/D converter 81 are removed from the color differential signal (R−Y, B−Y). Pedestal levels of the color differential signals (R−Y, B−Y) are clamped by a clamping circuit 76.

The color differential signals (R−Y, B−Y) are inputted to an A/D converter 81, which along with the signal from A/D converter 80, is represented by FIG. 11(f) and sampled and A/D converted based on the clock $f_{sm}$ inputted from the clock generating circuit 79. Then, the color differential signals are inputted to the C-memory 52, and written to an address based on a control by the memory control circuit 91. Note, since the color differential signals (R−Y, B−Y) are line-sequential-recorded on the magnetic disk D, the color differential signal (R−Y) and the color differential signal (B−Y) are written alternately.

The luminance signal is read from the Y-memory 51 and sampled and D/A converted by the D/A converter 54, based on the clock $f_{sh}$ (=4×$f_{sm}$) generated by a clock generating circuit 82. The D/A converted luminance signal is outputted to a blanking sync mixing circuit 61 through a low pass filter 83. In the blanking sync mixing circuit 61, the luminance signal is added to a horizontal synchronizing signal and a vertical synchronizing signal outputted by a synchronizing-signal-generating circuit 53.

The color differential signals are read from the C-memory 52 based on the clock $f_{sh}$, and outputted to an isochronizing circuit 57. Since the color differential signal (R−Y) and the color differential signal (B−Y) are alternately read out at every horizontal scanning line from the C-memory 52, when the color differential signal (R−Y) is outputted from the isochronizing circuit 57, the color differential signal (B−Y), which is outputted ahead the color differential signal (R−Y) by one horizontal scanning line, is delayed and outputted from the isochronizing circuit 57. Therefore, the color differential signal (R−Y) and the color differential signal (B−Y) are simultaneousely outputted from the isochronizing circuit 57.

Namely, when the color differential signal (R−Y) is read out from the C-memory 52 in a horizontal scanning period, the color differential signal (R−Y) is directly outputted to a D/A converter 55, and the color differential signal (B−Y) which has been read out from the C-memory 52 one horizontal scanning period in advance is outputted to a D/A converter 56.

The D/A converted color differential signals (R−Y, B−Y) are outputted to respective blanking sync mixing circuits 62 and 63 through low pass filters 84 and 85, respectively. In the blanking sync mixing circuits 62 and 63, the color differential signals (R−Y, B−Y) are added to horizontal synchronizing signal and a vertical synchronizing signal outputted by the synchronizing-signal-generating circuit 53.

Each of the luminance signal (Y+S(H)) and the color differential signals (R−Y(H), B−Y(H)) outputted from the blanking sync mixing circuits 61, 62 and 63 are inputted to a display device, not shown.

Figure 9:
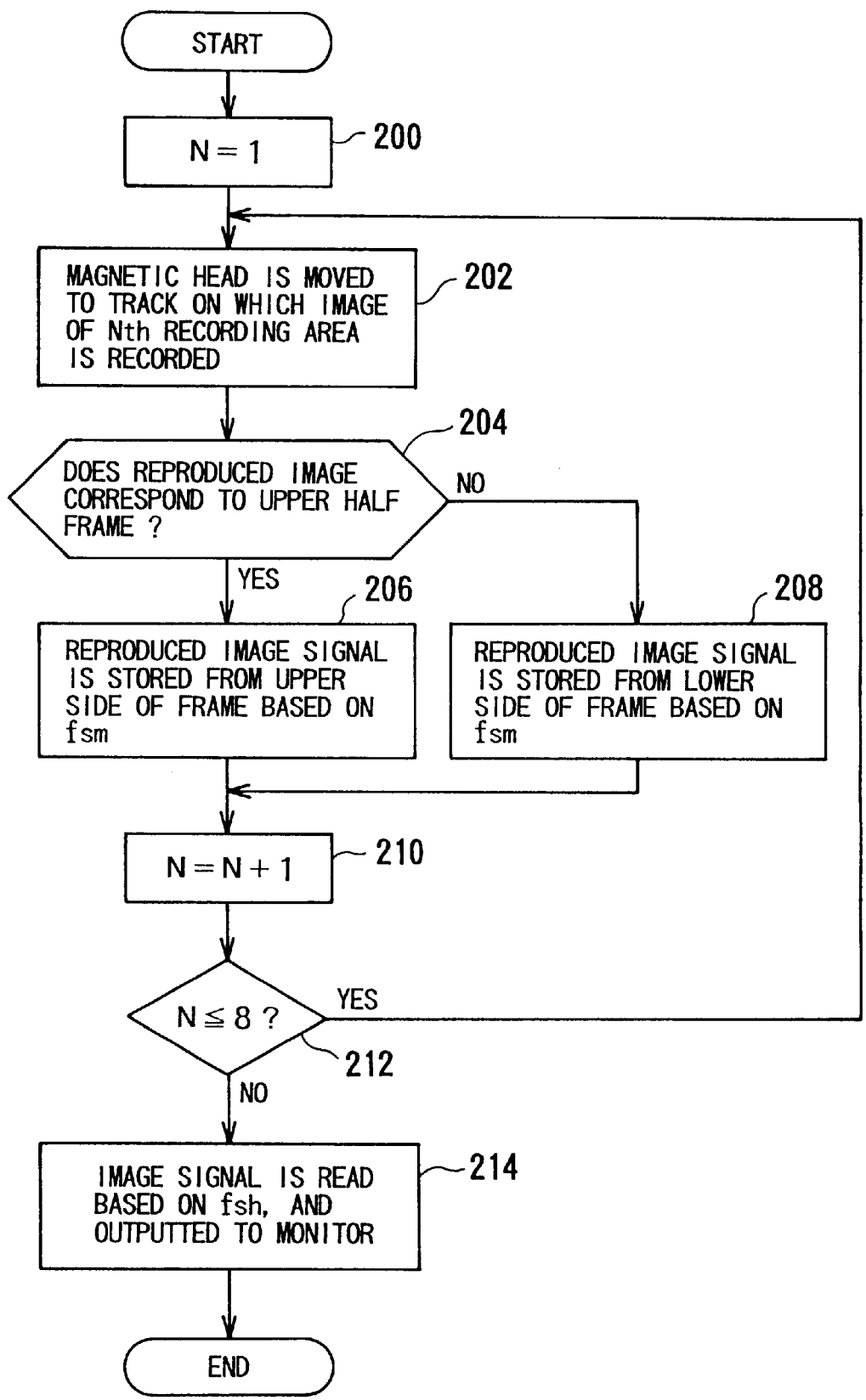
FIG. 9 is a flow chart of a program by which a luminance signal and color differential signals are reproduced.

FIG. 9 shows a flow chart of a program by which a luminance signal and color differential signals are reproduced from the magnetic disk D, stored in the Y-memory 51 and the C-memory 52, and then outputted from the still video device. This program is executed by the system control circuit 10.

In Step 200, counter N is set to "1". In Step 202, based on track information of the magnetic disk D stored in the work memory, the magnetic head 11 is moved to a track on which the first recording area 161 (see FIG. 4) of an image signal divided into four parts is recorded.

Note, when track information of the magnetic disk D is not stored in the work memory, i.e., when a new magnetic disk is mounted in the still video device, all of the tracks of the magnetic disk D are read out so that an ID code DPSK-modulated and superimposed on each of the tracks is detected by the ID-reproduction process circuit 74, and information written in the ID code is stored in the work memory.

When the magnetic head 11 has been moved to the target track, the image signal recorded on the track is read out in Step 202.

In Step 204, based on the record system information recorded in the user's area of the ID code reproduced together with the image signal, it is determined whether the reproduced image signal corresponds to the upper half of the divided frame, and whether the reproduced image signal corresponds to the recording area corresponding to the value in the counter N. Namely, it is determined to which part of the divided frames the image signal, which is reproduced from the magnetic disk D, corresponds.

When the image signal corresponding to the upper half is reproduced, i.e., when the image signal corresponds to the first, second, fifth or sixth recording area shown in FIG. 4, the process goes to Step 206. Conversely, When the image signal corresponding to the lower half is reproduced, i.e., when the image signal corresponds to the third, fourth, seventh or eighth recording area shown in FIG. 4, the process goes to Step 208.

In the case in which the image signal of the upper half is reproduced, in Step 206, the luminance signal (Y+S) and the color differential signals (R−Y, B−Y) are written in the Nth recording area in such a manner that the signals are stored in an order corresponding to a direction from an address having a low number to an address having a high number. For example, in case of the luminance signal in N=1, as shown in FIG. 5, the luminance signal is stored in the order Pa(1)→Pb(1)→Pa(2)→Pb(2)→ . . . →Pa(n−2)→Pb(n−2)→Pa(n−1)→Pb(n−1) in the first recording area 161 of the Y-memory 51. Namely, the upper half of the frame is stored in a direction which is shown by the arrow 173 in FIG. 4 and directed from the upper side of the frame to the middle portion of the frame.

Conversely, in the case in which the image signal of the lower half is reproduced, in Step 208, the luminance signal (Y+S) and the color differential signals (R−Y, B−Y) are written in the Nth recording area in such a manner that the signals are stored in an order corresponding to a direction from an address having a high number to an address having a low number. For example, in case of the luminance signal in N=3, as shown in FIG. 5, the luminance signal is stored in the order Pa(2n)→Pb(2n)→Pa(2n−1)→Pb(2n−1)→Pb(2n−1)→ . . . →Pa(n+1)→Pb(n+1)→Pb(n) in the third recording area 163 of the Y-memory 51. Namely, the lower half of the frame is stored in a direction which is shown by the arrow 174 in FIG. 4 and directed from the lower side of the frame to the middle portion of the frame.

Thus, the image signal recorded on one track of the magnetic disk D is reproduced, and the upper and lower half image signals are stored, according to the record system information, in the memories 51 and 52 in such a manner that the upper half of the frame is stored in a first order and the lower half of the frame is stored in a second order which is the inverse of of the first order as represented by FIG. 11(g).

When the writing operation of the image signal of one track has been completed, the counter N is incremented by 1 in Step 210, and it is determined in Step 212 whether the counter N is smaller than or equal to 8.

When it is determined in Step 212 that the counter N is smaller than or equal to 8, the process returns to Step 202, and thus, the magnetic head 11 is moved to a track on which the next image signal is recorded, i.e., a track positioned inwardly the previous track by one track, for example. Then, the next image signal is reproduced, so that Step 204 is carried out based on the ID code and the counter N, and then Step 206 or 208 is carried out. Thus, when the writing operation carried out in a predetermined order is completed, the state in which the image signal is stored in each of the recording areas 161 through 168 is as described with reference to FIG. 4.

Conversely, if it is determined in Step 212 that the counter N is larger than 8, i.e., if all of the image signals of the first and second fields are written in the Y-memory 51 and the C-memory 52, the process goes to Step 214, in which the image signals stored in the Y-memory 51 and the C-memory 52 begin to be read out. This reading operation is carried out in such a manner that, based on the sampling clock $f_{sh}$ outputted by the clock generating circuit 82, the memory control circuit 91 generates addresses in order starting from the first address and outputs them to the Y-memory 51 and the C-memory 52.

Namely, as described below, the luminance signal and the color differential signals are read out from each of the memories 51 and 52, in the same order as that in which the signals are stored in the memories 26, 27 and 28, so that the one frame image signal is reproduced.

First, the image signal of the first field is read out, as shown in FIG. 5, in the order Pa(1)→Pb(1)→Pc(1)→Pd(1)→Pa(2)→Pb(2)→Pc(2)→ . . . →Pd(2)→Pa(n−1)→Pb(n−1)Pc(n−1)→Pd(n−1)→Pa(n)→Pb(n)→Pc(n)→Pd(n)→ . . . →Pa(2n−1)→Pb(2n−1)→Pc(2n−1)→Pd(2n−1)→Pa(2n)→Pb(2n)→Pc(2n)→Pd(2n), and then the image signal of the second field is read out in the same order, as represented by FIG. 11(h).

Figure 10:
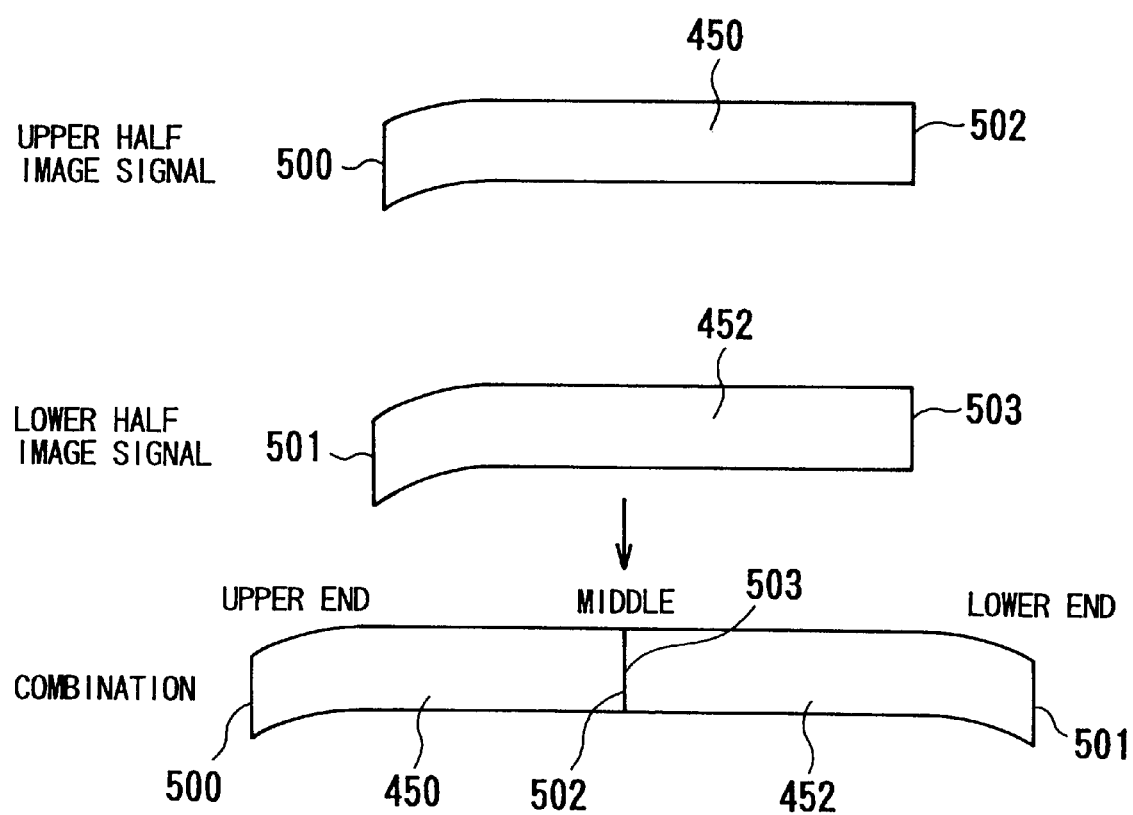
FIG. 10 is a diagram showing an operation in which image signals recorded on a magnetic disk of the reproducing system of FIG. 8 are reproduced and combined and form one frame image.

FIG. 10 shows an operation in which image signals recorded in the magnetic disk D are reproduced and combined to form one frame image.

As shown in this drawing, in the reproduced image signal 450 of the upper half of the frame which is stored in the first, second, fifth and sixth recording areas, the signal level of the leading portion 500 of the image signal is lowered, due to characteristics of the clamping circuits 43, 44 and 45, when reproducing the divided image signal recorded on each of tracks. Similarly, in the reproduced image signal 452 of the lower half of the frame which stored in the third, fourth, seventh and eighth recording areas, signal level of the leading portion 501 of the image signal is lowered. The leading portion 500 is placed at the upper end of the frame, and the leading portion 501 is placed at the lower end of the frame, and thus, the signal portion 502 of the upper half and the signal portion 503 of the lower half have approximately the same levels, so that a join does not occur at the boundary between the upper and lower half frames.

Therefore, according to the still video device of the above embodiment, a high definition image signal can be recorded on a recording medium, and a join is prevented from occurring on the boundary portion generated by dividing the image signal when it is recorded on the recording medium.

Further, according to the embodiment, it is not necessary to add a new circuit in a conventional circuit and the space in which the circuits are mounted in the still video device need not be increased. As a result, the manufacturing cost of the still video device is not increased, and the still video device does not become bulky.

When an image signal such as a high vision video signal having more scanning lines than the still video format is recorded in the still video format in which the bandwidth of a recorded signal is narrower than the high vision video format, the original image frame is divided and each of the divided image frames is recorded on the magnetic disk D in the still video format. In this case, since the number of the scanning lines of each of the divided image frames is larger than that of one image frame of the still video format, the image signal of the divided image signal must be recorded immediately after the end of a vertical synchronizing signal. Further, the pedestal level of each horizontal scanning line is clamped at a standard level by the A/D conversion, so that a fluctuation of the reproduced image signal is compensated to prevent the image signal from being influenced by the fluctuation.

Therefore, if the image signal is recorded immediately after the end of a vertical synchronizing signal, the levels of the luminance signal and the color differential signals immediately after the vertical synchronizing signal are lowered, since the image signal is inputted to the still video device in a state in which the clamping operation of the clamping circuit which has been stopped for the vertical synchronizing period is not recovered. Therefore, in the embodiment, the portions in which the signal levels of the luminance signal and the color differential signals are lowered are disposed at the uppermost and lowermost portions of the frame in which the lowered signal levels are hardly visually recognized, so that the visual evaluation of the image signal is prevented from being lowered.

Although the image signal of high quality recorded on the magnetic disk 0 may be formed according to the high vision format in the embodiment, the present invention is not restricted to the high vision format, and can be applied any type of HDTV system.

The number of divisions into which the inputted image signal is divided may be other than four. Namely, the number of divisions may be two, and in this case, when the frame is divided by a straight line extending in a horizontal direction, the present invention is effective.

The order in which the divided image signals are read from the Y-memory 26, the R–Y-memory 27 and the B–Y-memory 28 is not restricted to that shown in FIG. 4. Namely, after the image signals stored in the first and second recording areas are recorded on the magnetic disk D, the image signals stored in the fifth and sixth recording areas may be recorded. Then, after the image signals of the third and fourth recording areas are recorded, and the image signals of the seventh and eighth recording areas may be recorded.

Regarding the reading operation for the third, fourth, seventh and eighth recording areas, instead of an order such as Pa(2n)→Pb(2n) as shown in FIG. 5, the image signal may be read out in an order such as Pb(2n)→Pa(2n).

Note, although only the reproduction in which the original image is reproduced from the divided image signal to form the whole frame is described in the above embodiment, a single divided image frame may be reproduced. In this case, when a lower half frame is reproduced, since the image signal was recorded on the magnetic disk in the inverse order to an upper half frame, the reproduction must be carried out opposite to the order of recording is changed.

Further note, although the image signal is recorded in the frame record mode in the above embodiment, the image signal may be recorded in the field record mode.

Although the embodiments of the present invention have been described herein with reference to the accompanying drawings, obviously many modifications and changes may be made by those skilled in this art departing from the scope of the invention.

the present disclosure relates to subject matter contained in Japanese Patent Application No. 5-129974 (filed on May 6, 1993) which is expressly incorporated herein by reference in its entirety.

We claim:

1. A device for a still video device that processes an image signal, corresponding to one frame, inputted into said still video device, said image signal processing device comprising:

a first storage system that stores said image signal in a first memory so that an order of horizontal scanning lines corresponding to said image signal stored in said first memory is the same as an order of horizontal scanning lines inputted to said still video device;

a first reading system that reads said image signal stored in said first memory, such that an upper half of said frame is read in a first order and a lower half of said frame is read in a second order that is an inverse of said first order;

a recording system that records said image signal corresponding to said one frame to a recording medium, said image signal of said one frame including an upper half image signal corresponding to said upper half of said frame and a lower half image signal corresponding to said lower half of said frame;

a second reading system that reads said upper half image signal and said lower half image signal recorded to said recording medium;

an A/D converting system that A/D converts said upper half image signal in accordance with said first order, and A/D converts said lower half image signal in accordance with said second order;

a clamping circuit by which a pedestal level of said image signal is clamped at a standard level for A/D conversion by said A/D converting system;

a second storage system that stores said upper half image signal and said lower half image signal, outputted from said A/D converting system, to a second memory, said second storage system storing said upper half image signals in such a manner that said upper half image signal is stored in said first order corresponding to a direction from an address having a low number to an address having a high number, said second storage system storing said lower half image signals in such a manner that said lower half image signal is stored in said second order corresponding to a direction from an address having a high number to an address having a lower number, a first portion corresponding to said address having a low number of said upper half image signal being placed at an upper end of said frame and a second portion corresponding to said address having a high number of said lower half image signal being placed at a lower end of said frame, a signal level of said first portion and a signal level of said second portion being lowered due to predetermined characteristics of said clamping circuit; and a third reading system that reads said upper half image signal and said lower half image signal from said second storage system, in one of a third order corresponding to a direction from an address having a low number to an address having a high number, and a fourth order corresponding to a direction from an address having a high number to an address having a low number, said third reading system outputting said upper half image signal and said lower half image signal to a display in such a manner to produce a sequential scanning of horizontal scan lines in a single direction corresponding to one of said third order and said fourth order.

2. The device of claim 1, wherein said first order corresponds to a direction from an upper side of said frame to a middle portion of said frame, and said second order corresponds to a direction from a lower side of said frame to said middle portion of said frame.

3. The device of claim 1, wherein said first storage system stores said image signal based on a first sampling clock, said first reading system reading said image signal based on a second sampling clock, a frequency of said second sampling clock being lower than a frequency of said first sampling clock.

4. The device of claim 1, wherein said recording system superimposes record system information on each of said upper half image signal and said lower half image signal, said record system information being used in said first reading system, said A/D converting system and said second storage system, to determine whether said image signal on which said record system information is superimposed corresponds to said upper half of said frame or said lower half of said frame.

5. The device of claim 4, further comprising a detecting system that detects said record system information superimposed on each of said upper half image signal and said lower half image signal; and a third reading system that reads said upper half image signal and said lower half image signal stored to said second memory, in a same order as that in which said first storage system stores said image signal, so that said image signal is reproduced.

6. The device of claim 5, wherein said second storage system stores said upper half image signal and said lower half image signal based on said second sampling clock, said third reading system reading said upper half image signal and said lower half image signal based on said first sampling clock.

7. The device of claim 1, further comprising a reproducing system that reads said upper half image signal and said lower half image signal from said second memory to reproduce said upper image signal and said lower half image signal on a monitor.

8. A device for a still video device that processes an image signal, corresponding to one frame, inputted into said still video device, said image signal processing device comprising:

first means for storing said image signal in such a manner that an order of horizontal scanning lines corresponding to said image signal stored in said first storing means is the same as an order of horizontal scanning lines inputted to said still video device;

means for reading said image signal stored in said first storing means, such that an upper half of said frame is read in first order and a lower half of said frame is read in a second order that is an inverse of said first order;

means for recording said image signal corresponding to said one frame to a recording medium, said image signal of said one frame including an upper half image signal corresponding to said upper half of said frame and a lower half image signal corresponding to said lower half of said frame;

second means for reading said upper half image signal and said lower half image signal recorded to said recording medium;

means for A/D converting said upper half image signal in accordance with said first order, said A/D converting means further converting said lower half image signal in accordance with said second order;

means for clamping a pedestal level of said image signal at a standard level for A/D conversion by said A/D converting means;

second means for storing said upper half image signal and lower half image signal outputted from said A/D converting means, said second storing means storing in said upper half images signals in such a manner that upper half image signal is stored in said first order corresponding to a direction from an address having a low number to an address having a high number, said second storing means storing said lower half image signal in such a manner that said lower half image signal is stored in said second order corresponding to a direction from an address having a low number to an address having a lower number, a first portion corresponding to said address having a low number of said upper half image signal being placed at an upper end of said frame and a second portion corresponding to said address having a high number of said lower half image signal being placed at a lower end of said frame, a signal level of said first portion and a signal level of said second portion being lowered due to predetermined characteristics of said clamping means; and third means for reading said upper half image signal and said lower half image signal from said second storing means, in one of a third order corresponding to a direction from an address having a low number to an address having a high number, and a fourth order corresponding to a direction from an address having a high number to an address having a low number, said third reading means outputting said upper half image signal and said lower half image to a display in such a manner to produce a sequential scanning of horizontal scan lines in a single direction corresponding to one of said third order and said fourth order.

9. The device of claim 8, wherein said first order corresponds to a direction from an upper side of said frame to a middle portion of said frame, and said second order corresponds to a direction from a lower side of said frame to said middle portion of said frame.

10. The device of claim 8, further comprising means for superimposing record system information on each of said upper half image signal and said lower half image signal to determine whether said image signal on which said record system information is superimposed corresponds to said upper half of said frame or said lower half of said frame.

11. The device of claim 10, further comprising means for detecting said record system information superimposed on each of said upper half image signal and said lower half image signal.

* * * * *